United States Patent [19]

Krude et al.

[11] 4,348,196

[45] Sep. 7, 1982

[54] UNIVERSAL JOINT

[75] Inventors: Werner Krude, Siegburg-Kaldauen; Peter Harz, Hennef, both of Fed. Rep. of Germany

[73] Assignee: Uni-Cardan Aktiengesellschaft, Siegburg, Fed. Rep. of Germany

[21] Appl. No.: 158,253

[22] Filed: Jun. 10, 1980

[30] Foreign Application Priority Data

Jun. 20, 1979 [DE] Fed. Rep. of Germany ....... 2924844

[51] Int. Cl.[3] ............................................. F16D 3/40
[52] U.S. Cl. .............................. 464/11; 277/212 FB; 308/187.2; 464/131
[58] Field of Search ............................ 64/17 R, 17 A; 277/212 FB; 308/187.2; 74/18.2

[56] References Cited

U.S. PATENT DOCUMENTS 4,147,041 4/1979 Girguis et al. ...................... 64/17 A Primary Examiner—Tony M. Argenbright
Attorney, Agent, or Firm—Toren, McGeady & Stanger

[57] ABSTRACT

A universal joint having a trunnion cross adapted to be received in the arms of a pair of yokes is formed with a continuous resilient seal member loosely extending over the body of the trunnion cross and adapted to contain therein a supply of lubricant located within a recess formed with a center of the recess spaced closer to the axis of symmetry of the trunnion cross than the peripheral portions of the recess. Grooves extend from the trunnion members to the center of the recess, with the grooves being arranged to have an angle of inclination relative to the axis of symmetry of the trunnion cross.

3 Claims, 10 Drawing Figures

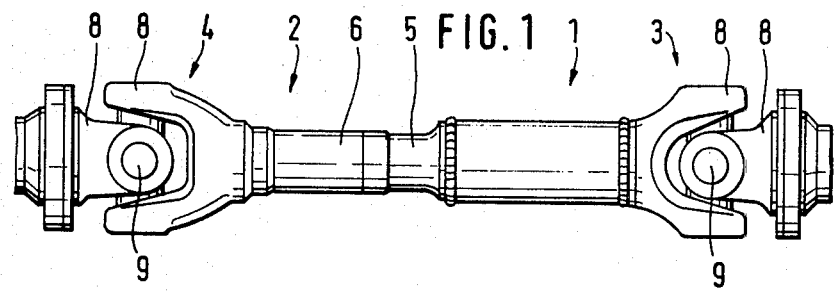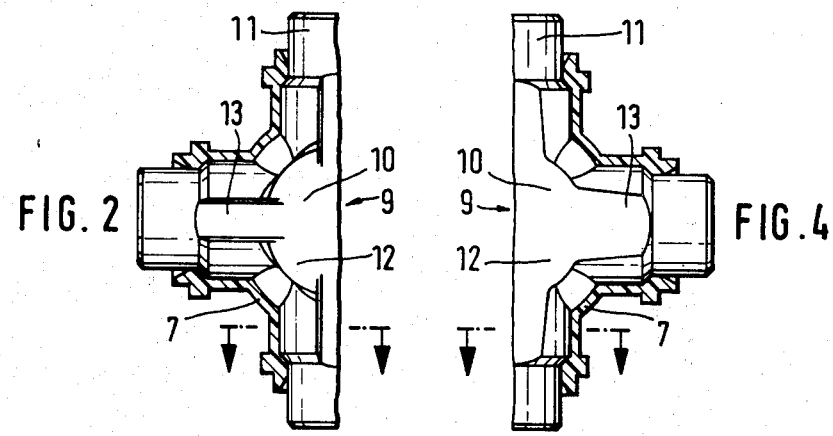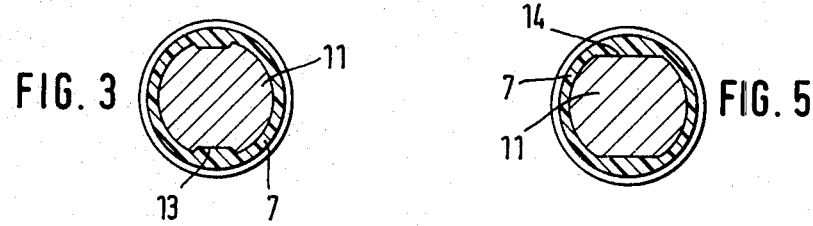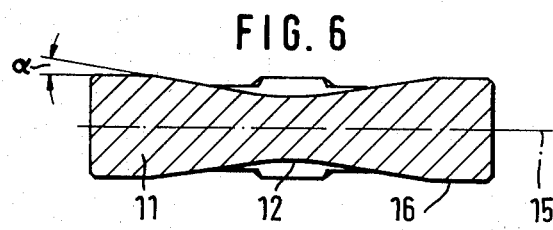

UNIVERSAL JOINT

The present invention relates generally to the structure of universal joints and more particularly to joints of the type wherein a trunnion cross connecting the yoke arms of a pair of yokes and having bearing means thereon arranged to be received in the bores of the yoke arms is covered with a single continuous elastic seal member which loosely covers the body of the trunnion cross and which is preferably made of plastic, rubber or similar material and which operates simultaneously to seal the bearing members of the trunnion cross.

In accordance with the prior art relating to the present invention represented by U.S. Pat. No. 4,147,041, a universal joint is provided wherein a seal opposite the bearing member is structured as a contact seal and wherein the body of the trunnion cross is structured in such a way that between the trunnion cross and the elastic seal a supply of lubricant is provided.

The present invention is directed as an improvement over this prior art device and the invention aims toward providing a construction of the trunnion cross which insures maintenance-free lubrication throughout the service life thereof by enabling a supply of lubricant to be contained so that lubricant feed to the bearing points will only occur with the device in the assembled condition.

SUMMARY OF THE INVENTION

In accordance with the present invention, the body of a trunnion cross of a universal joint is formed with recesses for supply of lubricant wherein the center portion of the recess is formed with a deeper indentation, and is spaced a smaller distance from the axis of symmetry of the trunnion cross than the peripheral edges of the trunnion defining the periphery of the recess, with grooves being arranged to extend from the center of the recesses to the trunnion at an angle of inclination relative to the axis of symmetry of the trunnion cross.

The advantage of the structure of the present invention lies in the fact that the grooves arranged at an angle of inclination along the body of the trunnion cross are exposed when the ends of the seal of the trunnion cross are pressed together, this exposure occurring only during assembly of the trunnion cross in the yoke arms. The grooves are constructed as lubricating ducts and are closed in the disassembled condition so that any lubricant which may be present cannot leak out through the grooves. The reason for this is that during manufacture of the casing, for instance, by immersion or spraying with a suitable material, the lubricant ducts previously located in the trunnion cross are also filled and only release these lubrication ducts for the appropriate lubrication throughout the service life due to the angle of inclination and the pressing together of the seal ends. An advantage also arises in that the seal ends of the resilient seal member surrounding the trunnion cross are pressed together during operation to compensate for the resulting wear by means of an automatic adjustment of the seal ends. In case any axial play exists in the trunnion cross mounting, the creation of noise is also prevented due to the prestressing of the seals.

The lubricant may be introduced in various ways. On the one hand, lubricant may be stored in a bearing bush before assembly and, during assembly, the lubricant will flow through the ducts into the recesses of the trunnion cross due to pressure applied against the ends of the seal by the bearing bushings of the joint. Consequently a supply of lubricant will be formed. On the other hand, the lubricant supply may already be established before assembly in the recess of the trunnion cross with the aid of an injection device. Since the seal ends which are not pressed together close the ducts in the manner of a valve, the lubricant will remain in the supply space until assembly of the trunnion cross is accomplished. By pressing together the seal ends of the bearing bushes, these ducts will be released and permanent lubrication may then be caused to exist.

In accordance with another feature of the invention it is provided that the widths of the grooves remain constant over the entire axial length thereof and that the cross section of the grooves on the side thereof facing the trunnion is smaller than on the side facing the recess.

An embodiment of this type has the advantage that it may be advantageously manufactured.

A further favorable variation of the lubricant duct is provided in accordance with another significant feature of the invention wherein the grooves on the side facing the trunnion have a smaller cross section and width with a larger cross section and width being provided on the side facing the recess.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings

FIG. 1 is a general view of a universal joint shaft having universal joints arranged on the outer ends thereof;

FIG. 2 is a partially sectioned end view of a trunnion cross formed in accordance with the invention;

FIG. 3 is a sectional view of one of the trunnion members of the trunnion cross of FIG. 2;

FIG. 4 is a partially sectioned end view of a trunnion cross generally formed in accordance with the principles utilized in forming the trunnion cross of FIG. 2 wherein however an additional embodiment of a lubricant duct is provided;

FIG. 5 is a cross-sectional view of one of the trunnion members of the trunnion cross of FIG. 4;

FIG. 6 is a cross-sectional view of a trunnion according to FIG. 4 shown in section without a seal;

DETAILED DESCRIPTION OF THE PREFERRED EMBODIMENTS

Figure 7:
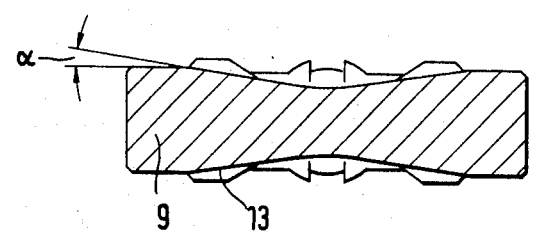
FIG. 7 is a sectional view of a trunnion cross without the seal shown as an individual part with a lubricating duct of the type in accordance with FIG. 2.

Referring now to the drawings wherein similar reference numerals are used to refer to like parts throughout the various figures thereof, a universal joint shaft is shown in FIG. 1 as comprising a pair of coaxial shaft portions 1 and 2 which carry at their outer ends universal joints 3 and 4 having yoke arms 8 connected by means of a trunnion cross 9.

The universal joint shaft portion 1 is constructed at its inner end as a solid shaft 5 and the universal joint shaft portion 2 is constructed as a hollow shaft 6. The solid shaft 5 and the hollow shaft 6 are connected together by means of a splined shaft connection so as to be rotatably fixed but axially slideable relative to each other.

The trunnion cross 9 is shown in greater detail in FIGS. 2 and 3 and is essentially comprised of a base member 10 with trunnions 11 arranged thereon at equal distances therefrom. The trunnions 11 serve to receive the slide or roller bearings or bushes of the appropriate yoke arms 8 of corresponding shafts 5 and 6. The trunnion cross 9 is provided with a single elastic seal 7 for effecting a sealing function. The seal 7 extends up to the trunnions 11. The seal 7, which is not glued or adhered to the member 10 of the trunnion cross 9 may be lifted off the surface of the base member 10 so that during assembly of the device or before assembly of the cross 9 in the yokes 8, lubricant may be pressed into recesses 12 formed in the base member 10. Due to expansion of the seal 7, pressure will be applied upon the lubricant in the supply space so that the lubricant will continuously flow through grooves 13 which are constructed as lubrication ducts and which therefore extend to reach the areas to be supplied with lubricant.

A trunnion 11 shown in sectional view in FIG. 3 is surrounded by the elastic seal 7 and is formed with lubrication ducts 13 constructed as grooves, with the width of each of the grooves 13 being configured to be constant over the entire axial length thereof up to the trunnion 11.

In FIG. 4, a lubrication duct 13 is shown which narrows starting from the recess 12 and extending up to the trunnion 11. This lubrication duct 13 is shown in FIG. 5 in section wherein the trunnion 11 is surrounded by the elastic seal 7 and wherein the lubrication duct 13 is formed in this embodiment merely by a flattened portion 14.

Shown in FIG. 6 in sectional view is a trunnion cross wherein, starting from an axis of symmetry 15 thereof, the recess 12 is arranged to be closer to this axis of symmetry 15 than in the peripheral area 16 of the trunnion cross. As a result of this configuration, the lubrication ducts 13 extend at an angle of inclination α.

Figure 8:
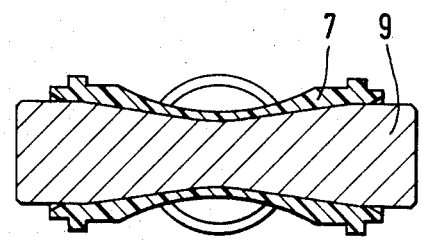
FIG. 8 is a sectional view of a trunnion cross with an elastic seal shown without a lubricant supply.
Figure 9:
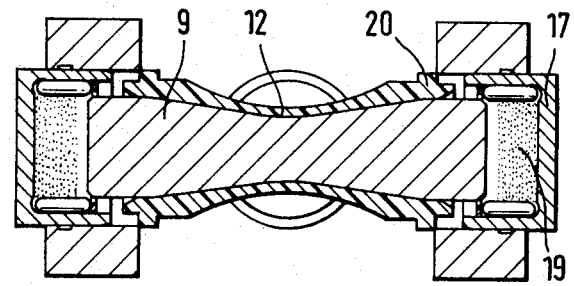
FIG. 9 is a sectional view of a trunnion cross having a bearing and showing yokes in a condition before assembly.

FIG. 8 merely shows a trunnion cross 9 and an elastic seal in section which, in FIG. 9, is shown in the semi-assembled condition. In FIG. 7 however a trunnion cross 9 is shown in section without the elastic seal wherein the lubrication ducts 13 extend at the angle of inclination α.

Figure 10:
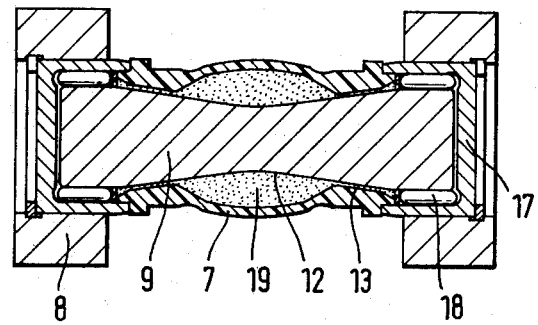
FIG. 10 is a cross-sectional view of a trunnion cross structured in accordance with the principles of the structure of FIG. 9 wherein however the completely assembled condition is depicted.

However, in FIG. 9, the bearing bushes 17 are filled with lubricant 19 and when the bearing bushes are pressed together relative to each other into the position shown in FIG. 10, the ends 20 of the elastic seal are pressed together and the lubrication ducts are exposed so that the lubricant 19 stored in the bearing bushes may reach the recesses 12 of the trunnion cross.

In FIG. 10 there is shown an arrangement wherein the trunnion cross 9 is surrounded by an elastic seal 7, and wherein the yoke arms 8 have bearing bushes 17 arranged therein, with the yoke arms 8 receiving the trunnion cross by means of a roller bearing 18. In the assembled condition, the lubricant ducts 13 are released from the elastic seal 7 and the lubricant 19 may reach the bearing points without difficulty.

While specific embodiments of the invention have been shown and described in detail to illustrate the application of the inventive principles, it will be understood that the invention may be emboided otherwise without departing from such principles.

What is claimed is:

1. A universal joint comprising: a trunnion cross defining an axis of symmetry thereof adapted to connect the yoke arms of a pair of yokes, said trunnion cross including trunnion members having arranged thereon bearing means adapted to be received in bores of said yoke arms; a continuous resilient seal member loosely extending over the body of said trunnion cross which also acts as a seal for said bearing means and is constructed as a contact seal, said trunnion cross being constructed in such a way that a lubricant supply is arranged between said trunnion cross and said seal member; recess means formed in said trunnion cross for containing therein a supply of lubricant, said recess means being formed with a greater depth at the center portion thereof, said center portion being spaced closer to the axis of symmetry of said trunnion cross than peripheral areas of said recess means surrounding said center portion; and grooves extending in the longitudinal direction of said trunnion members from said peripheral areas of said recess means toward the ends of said trunnion members, said grooves being arranged with an angle of inclination relative to said axis of symmetry, with the inclination of said grooves being such that said grooves tend to deepen inwardly of said trunnion members in the direction of said recess means, said sealing member being in resilient sealing engagement with said grooves and operating to permit lubricant to be supplied to said recess means through said grooves by resilient deformation of said seal member and to enable lubricant contained in said recess means to effect lubrication of said bearing means through said grooves, said flow of lubricant being enhanced by the inclined orientation of said grooves.

2. A universal joint according to claim 1 wherein said grooves are formed with a width which is constant over the entire axial length thereof and wherein the cross section of said grooves on the side thereof facing said trunnion members is smaller than the cross section of a side thereof facing said recess.

3. A universal joint according to claim 1 wherein said grooves are formed on the side thereof facing said trunnion member with a smaller cross section and width and on the side thereof facing said recess with a larger cross section and width.

* * * * *